US008356746B2

(12) United States Patent
Flanagan et al.

(10) Patent No.: US 8,356,746 B2
(45) Date of Patent: Jan. 22, 2013

(54) ELECTRONIC PARKING VALIDATION (76) Inventors: Frank M. Flanagan, San Diego, CA (US); Christopher B. Tillotson, Santa Barbara, CA (US)

( * ) Notice: Subject to any disclaimer, the term of this patent is extended or adjusted under 35 U.S.C. 154(b) by 236 days.

(21) Appl. No.: 12/731,957

(22) Filed: Mar. 25, 2010

(65) Prior Publication Data
US 2011/0233274 A1    Sep. 29, 2011

Related U.S. Application Data

(60) Provisional application No. 61/317,170, filed on Mar. 24, 2010.

(51) Int. Cl.
*G06K 7/10* (2006.01)
(52) U.S. Cl. .......................................... 235/377; 235/384
(58) Field of Classification Search .................. 235/380, 235/381, 384, 375, 377; 705/13, 34, 40, 705/41
See application file for complete search history.

(56) References Cited

U.S. PATENT DOCUMENTS

| 2007/0083424 A1 | 4/2007 | Lang et al. | |
| 2010/0191585 A1* | 7/2010 | Smith | 705/13 |
| 2011/0313893 A1* | 12/2011 | Weik, III | 705/28 |

* cited by examiner

*Primary Examiner* — Karl D. Frech
(74) *Attorney, Agent, or Firm* — Greenberg Traurig, LLP (57) ABSTRACT

A method and system are disclosed for providing electronic parking validations. The method and system involve providing a parking ticket with a unique identifier to a patron upon arrival to a parking facility, where the unique identifier is associated with parking information. The method and system further involve using a web-based electronic parking validation system to confirm the parking ticket parking information with electronically stored parking information and to provide an electronic parking validation for the parking ticket. In order to confirm the parking ticket information with the electronically stored parking information and to provide an electronic parking validation for the parking ticket, a validator inputs into the web-based electronic parking validation system the unique identifier that is associated with the parking ticket. In some embodiments, the validator uses an electronic bar code scanner to scan electronically the unique identifier into the system.

49 Claims, 3 Drawing Sheets

ELECTRONIC PARKING VALIDATION

RELATED APPLICATION

This application claims the benefit of and priority to U.S. Provisional Application Ser. No. 61/317,170, filed Mar. 24, 2010, the contents of which are incorporated by reference herein in its entirety.

BACKGROUND

The present disclosure relates to parking validation. In particular, it relates to electronic parking validation.

SUMMARY

The present disclosure relates to a system, apparatus, and method for electronic parking validation. A parking validation is the process that changes the state of a patron's parking ticket from "unvalidated" to "validated". When the parking ticket is in the validated state, the patron's parking fee associated with the parking ticket is reduced or eliminated. In one or more embodiments, the method for electronic parking validation involves providing a parking ticket with a unique identifier to a patron upon arrival to a parking facility, where the unique identifier is associated with parking information. The method further involves confirming, with the use of a web-based electronic parking validation system, the parking ticket parking information with electronically stored parking information. Also, the method involves providing, with the use of the web-based electronic parking validation system, an electronic parking validation for the parking ticket.

In one or more embodiments, the unique identifier on the parking ticket is a barcode. In some embodiments, the unique identifier is stored using an encoding card technology. Types of encoding card technologies that may be used for the disclosed system and method include, but are not limited to, magnetic stripe, smart card, and optical card technologies. In at least one embodiment, the unique identifier is a human readable alphanumeric string that is printed on the parking ticket. In one or more embodiments, the unique identifier is a uniquely identifiable passive radio frequency identifier (RFID) device embedded in the parking ticket.

In some embodiments, a portion of the unique identifier on the parking ticket is used to confirm the parking ticket parking information and to provide electronic parking validation for the parking ticket. In at least one embodiment, the parking ticket includes time and day information relating to the arrival of the patron to the parking facility.

In one or more embodiments, in order to confirm the parking ticket parking information with the electronically stored parking information and to provide an electronic parking validation for the parking ticket, a validator inputs into the web-based electronic parking validation system the unique identifier that is associated with the parking ticket. In at least one embodiment, in order to input the unique identifier into the web-based electronic parking validation system, the validator electronically scans the unique identifier with an electronic barcode scanner. In other embodiments, in order to input the unique identifier into the web-based electronic parking validation system, the validator manually types into a keyboard a unique alphanumeric string. Also, in some embodiments, in order to input the unique identifier into the web-based electronic parking validation system, the validator reads the unique identifier with a reading device for the appropriate encoding card technology. Additionally, in other embodiments, in order to input the unique identifier into the web-based electronic parking validation system, the validator reads the unique identifier using a passive RFID reading device.

In at least one embodiment, the validator is associated with a validation provider that uses the parking facility for its patrons. In one or more embodiments, the validation provider is a business entity, a tenant, and/or a department. In some embodiments, the validator is a validation administrator user. The validation administrator user uses the web-based electronic parking validation system to create and manage validation associate user accounts. In one or more embodiments, the validator is a validation associate user.

In some embodiments, a facility manager user uses the web-based electronic parking validation system to create and manage validation administrator-user accounts. In one or more embodiments, a facility manager user uses the web-based electronic parking validation system to create and manage validation provider profiles. In at least one embodiment, the facility manager user simultaneously creates, in the web-based electronic validation system, the validation provider profile and a first validation administrator user account for that validation provider.

In one or more embodiments, the validation administrator user is able to replenish validation funds for a validation provider or pay a portion of a credit balance by providing a personal form of payment over an internet, which will deposit funds into a validation provider account. The funds are used to provide electronic parking validations for the parking tickets of the validation provider's patrons. In some embodiments, the validation provider has a predetermined line of credit of funds as specified by the facility manager user. In at least one embodiment, the facility manager user is able to configure the web-based electronic parking validation system such that the validation provider prepurchases validation funds that are deposited into a validation provider account.

In at least one embodiment, the web-based electronic parking validation system is configured to send the facility manager user an electronic mail (email) when the validation administrator user requires and requests additional validation funds. In some embodiments, the web-based electronic parking validation system is configured to send the facility manager user an email replenishment request when funds in a validation-provider account fall below a predetermined threshold limit. In one or more embodiments, when the validation administrator user desires to deposit funds into a validation provider account, a validation administrator user sends a request to replenish funds over the web-based electronic parking validation system. In response, the web-based electronic parking validation system sends an email to the facility manager user containing a web link that allows the facility manager user to approve or reject the request.

In some embodiments, a facility manager user is able to configure the web-based electronic parking validation system to establish parking-validation default settings for the validation provider's validators that represent the most common type of parking validation. In one or more embodiments, the validators are able to use the parking validation-default settings to provide one-click electronic parking validations to patrons. In some embodiments, the validator uses an appropriate reader device to scan electronically the unique identifier of the parking ticket in order to provide the one-click electronic parking validation.

In at least one embodiment, the facility manager user is able to configure the web-based electronic parking validation system to provide at least one of and any combination of the following types of validations: cash, aliases, time, percentage, and rate reduction. In one or more embodiments, the facility manager user is able to configure the web-based electronic parking validation system to establish unique aliases for cash validation amounts. In at least one embodiment, the facility manager user is able to configure the web-based electronic parking validation system to allow the validation providers to provide validations in the form of virtual time denomination tickets.

In one or more embodiments, the facility manager user sells virtual validation ticket books to the validation providers. Each virtual validation ticket book includes a predetermined number of the virtual time denomination tickets. In some embodiments, the virtual time denomination tickets each have a predetermined denomination of time.

In at least one embodiment, the facility manager user is able to configure the validation provider to be charged for over validating. In some embodiments, the facility manager user is able to configure the validation provider not to be charged for over validating. In one or more embodiments, the web-based electronic parking validation system provides to the facility manager user a report including the difference between the over validation amount and the actual parking fee. In some embodiments, the validation administrator user is able to configure the web-based system to display a patron details entry form.

In one or more embodiments, after the parking ticket parking information is confirmed with the electronically stored parking information, an elapsed time from a time of entry of the patron into the parking facility to present is displayed to the validator. In some embodiments, the electronic parking validation includes an additional predetermined amount of time to allow the patron to return to their vehicle and exit the parking facility. In at least one embodiment, after an electronic parking validation is provided for the parking ticket, a validation confirmation number is displayed to the validator. In one or more embodiments, after a validation confirmation number is displayed to the validator, the validation confirmation number continues to be displayed until the validator provides another electronic parking validation.

In at least one embodiment, the disclosed method further comprises displaying a message if there is a disruption in service that causes the web-based electronic parking validation system to not be able to provide electronic parking validations. In some embodiments, the message includes a description of a cause of the disruption in service. In some embodiments, if the disruption in service is caused by a disconnect in internet service, the web-based electronic parking validation system will attempt to reconnect to the internet for a predetermined number of times over a predetermined time period.

In at least one embodiment, the disclosed method further comprises transferring pertinent parking information to a database at a location remote from the parking facility. In some embodiments, the validator can use a mobile device to provide parking validations to patrons. In one or more embodiments, the web-based electronic parking validation system can manage multiple parking facilities. In some embodiments, the web-based electronic parking validation system can validate parking tickets from multiple parking facilities. In at least one embodiment, the patron uses the web-based electronic parking validation system to create and manage their own personal user account to be used for their own parking validations. In some embodiments, the disclosed method further comprises printing with an exit machine a validation mark onto the validated parking ticket when the patron inserts the validated parking ticket into the exit machine upon exiting the parking facility.

In one or more embodiments, the system for electronic parking validation involves an entry machine and a web-based electronic parking validation system. In some embodiments, the entry machine provides a parking ticket with a unique identifier to a patron upon arrival to a parking facility. The unique identifier is associated with parking information. In at least one embodiment, the web-based electronic parking validation system confirms the parking ticket parking information with electronically stored parking information. In addition, in some embodiments, the web-based electronic parking validation system provides an electronic parking validation for the parking ticket.

DRAWINGS

These and other features, aspects, and advantages of the present disclosure will become better understood with regard to the following description, appended claims, and accompanying drawings where:

DESCRIPTION

The methods and apparatus disclosed herein provide an operative system for parking validation. Specifically, this system relates to electronic parking validation.

Currently, conventional parking validation systems require a validation provider to provide manually a physical validation to a visiting patron's parking ticket. A validation is the act of reducing or eliminating the parking fee that is associated with a particular parking ticket. As such, the validation itself typically provides a discounted parking rate or free parking for the patron. After the patron presents a parking ticket containing parking information to the validation provider, the validation provider validates the parking ticket by providing a validation stamp, a validation sticker, a follow-up ticket, or other physical means.

This manual validation process requires property managers, parking managers, and/or validation providers to allocate excessive resources for manually providing and managing the manual provisioning of the physical validations. For example, resources are directed to determining whether a validation or a request for a validation is authorized or unauthorized. In addition, resources are directed towards analyzing and tracking validations issued by and to one or more validation providers. Accordingly, these manual validation systems result in excessive administrative costs that result from the need to track and manage the physical validation stamps and stickers.

In addition, these manual validation systems require the maintenance of effective communication between the validation providers and the patrons. Also, it should be noted that due to the ease by which these physical validations can be obtained, excessive financial losses associated with unauthorized validations and theft can occur. Accordingly, it is desirable to have an electronic validation system, apparatus, and method for providing electronic parking validations.

The system and method of the present disclosure provide a means for electronic parking validations. The disclosed method replaces the use of physical validation stamps, validation stickers, and follow-up tickets with a web-based electronic parking validation system that provides electronic validations to parking tickets. The disclosed web-based electronic parking validation system allows for accurate and organized back-office accounting of validation revenue as well as for the rapid and accurate validation of visiting patrons' parking tickets. The system of the present disclosure provides real-time validations, which gives patrons an efficient and streamlined parking validation experience. In addition, the system provides an accurate accounting of the validations given by each validation provider such that the validation providers are better able to understand their validation usage.

By scanning the parking ticket's barcode with an electronic barcode scanner or otherwise entering the unique identifier into the system, the web-based electronic validation system checks the validity of the parking ticket and applies validation rules associated with the validation provider's validation profile to that parking ticket. The disclosed system allows unique validation profiles to be created for each validation provider of the parking facility. For example, a validation provider's validation profile can be set up to allow the validation provider to provide percentage based parking validations, cash based parking validations, and/or time denomination based parking validations. The validation provider's validation profiles can be easily modified by the parking facility-manager user via the web-based electronic validation system. In addition, the system allows the parking facility-manager user to have real-time access to the validation history of the validation providers of the parking facility.

The disclosed web-based electronic validation system controls and manages the entire electronic validation process. Validation providers of the parking facility can deposit funds for future validations that they will provide for their patrons into an electronic validation provider account. Alternatively, the validation providers can be given a predetermined line of credit of funds that are to be used for their future validations.

The system of the present disclosure provides fast and accurate parking validations to patrons. A validator simply scans the barcode of the patron's parking ticket with an electronic barcode scanner or manually enters the unique identifier into the system, and the web-based electronic validation system applies the electronic parking validation to the parking ticket. Once the patron receives an electronic parking validation for their parking ticket, the patron can insert their validated parking ticket into the exit machine, have their parking fee eliminated, and exit the parking facility. In one or more embodiments, when a validated parking ticket is inserted into the exit machine, the exit machine will print or burn a validation mark on the validated parking ticket. In one or more embodiments, the patron can insert their validated parking ticket into the exit machine and realize a reduction in their parking fee. The patron will then pay the balance due with a credit card or cash. In some embodiments, the patron will hand their validated parking ticket to an attendant, have their parking fee eliminated, and exit the parking facility. In at least one embodiment, the patron will hand their validated parking ticket to an attendant and realize a reduction in their parking fee. Then, the patron will pay their balance due via a credit card or cash.

The disclosed method is designed to facilitate wireless or land based access to the web-based electronic validation system. As such, the disclosed system can be accessed via a desktop computer, laptop computer, web enabled personal digital assistant (PDA) and/or mobile device. In addition, the disclosed system is able to work in a secure manner over readily accessible communication channels. Types of communication systems that may be employed by the disclosed system include, but are not limited to, wireless, internet, web, transmission control protocol/internet protocol (TCP/IP), and cellular.

It should be noted that one important advantage of the disclosed electronic parking validation system, which is not provided by the manual parking validation systems that are currently being used, is that the disclosed system allows for each parking ticket to be electronically validated an unlimited number of times. Since the disclosed system does not use physical validations, there are no physical limitations to the number of validations that may be provided for each parking ticket. In addition, the facility manager user is able to configure the system to control how many validations that may be applied to one parking ticket.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Figure 1:
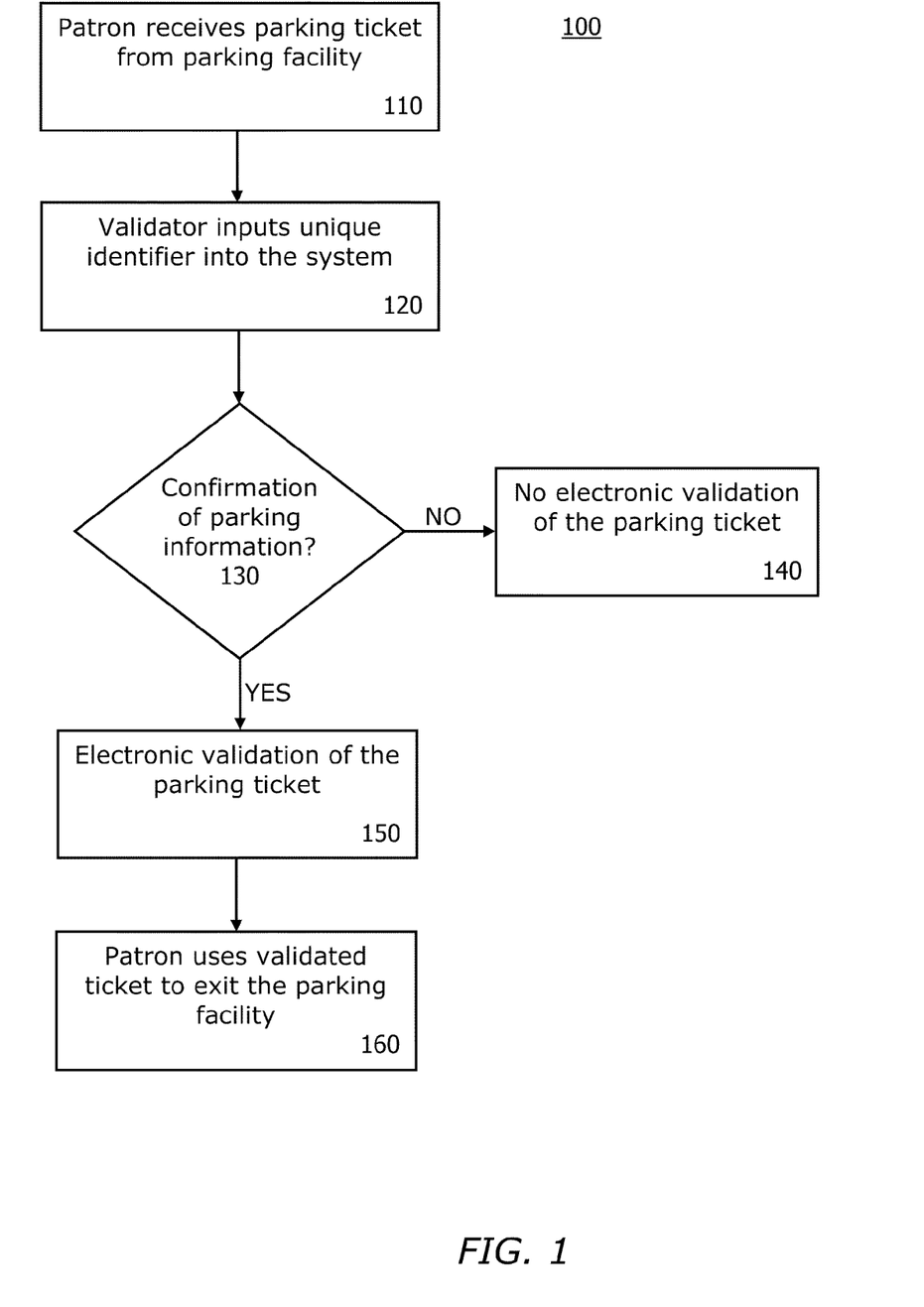
FIG. 1 depicts a simplified flow diagram of the disclosed electronic parking validation system and method, in accordance with at least one embodiment of the present disclosure.

FIG. 1 depicts a simplified flow diagram 100 of the disclosed electronic parking validation system and method, in accordance with at least one embodiment of the present disclosure. At step 110, once a patron arrives to a parking facility, the patron is provided with a parking ticket that has a unique identifier, which is associated with parking information relating to the arrival of the patron to the parking facility. The unique identifier on the parking ticket with associated with parking information that is related to that patron. For purposes of this disclosure, a parking facility is a physical location where patrons park and receive parking tickets upon entry to the facility. In addition, a patron is defined as a person who is parking at the parking facility.

After the parking ticket is dispensed to the patron, the disclosed system and method transfers and stores the parking information relating to that patron onto a system database. In one or more embodiments, the system database is at a location remote from the parking facility.

The unique identifier of the ticket may be associated with the parking ticket by various means. In one or more embodiments, the unique identifier may be a barcode that is printed onto the parking ticket. Types of barcodes that may be used for the present disclosure include, but are not limited to, European Article Number (EAN) barcodes and i205 barcodes. In addition, the barcode may be printed either crosswise on the parking ticket or lengthwise on the parking ticket. Also, in some embodiments, along with the unique identifier, the parking ticket will include the time and day information relating to the time and date of the arrival of the patron to the parking facility.

In some embodiments, the unique identifier is stored on the parking ticket by using an encoding card technology. The present disclosure may employ various types of encoding card technologies including, but not limited to, magnetic stripe, smart card, and/or optical card technologies. In other embodiments, the unique identifier on the parking ticket is a human readable alphanumeric string that is directly printed onto the parking ticket. In alternative embodiments, the parking ticket's unique identifier is stored on the parking ticket by using a uniquely identifiable passive radio frequency (RFID) device that is embedded into the parking ticket itself.

At step 120, the patron presents their parking ticket to a validator. This could occur upon the patron's first interaction with the validator or when the patron is ready to leave the parking facility. The validator has access to the disclosed web-based electronic parking validation system via a desktop computer, laptop computer, web enabled personal digital assistant (PDA) and/or mobile device. Once the validator receives the parking ticket from the patron, the validator inputs the unique identifier that is associated with the parking ticket into the system. In some embodiments, only a portion of the unique identifier is required by the system to obtain a full unique identifier.

The disclosed system and method allow the unique identifier to be inputted into the system by various ways. In one or more embodiments, the validator electronically scans the unique identifier into the system by using an electronic barcode scanner. In other embodiments, the validator manually types an alphanumeric string identifier into the system by using the keyboard of the desktop computer, laptop computer, web enabled personal digital assistant (PDA) or mobile device that the validator has used to access the system. In at least one embodiment, the validator uses an appropriate reading device for the encoding card technology that is used to store the unique identifier onto the parking ticket. In other embodiments, the validator uses a passive RFID reading device to read the unique identifier that is stored onto the parking ticket.

After the validator has inputted the unique identifier that is associated with the parking ticket into the disclosed web-based electronic parking validation system, at step 130, the system confirms the existence of the unique identifier with electronically stored parking information stored in a system database and verifies the parking ticket has not left the facility. In one or more embodiments, after the disclosed system confirms the parking ticket parking information, the elapsed time from the time of arrival of the patron to the parking to the present time is displayed on a computer screen to the validator. If the system confirms the parking ticket parking information, the system will allow that particular parking ticket to be validated. (See step 150). However, if the system is unable to confirm the parking ticket parking information, the system will not allow the validator to validate the parking ticket. (See step 140).

Once the system has confirmed the parking ticket parking information, at step 150, the system electronically validates the parking ticket of the patron. In some embodiments, once the system validates the parking ticket, a validation confirmation number is displayed on the computer screen to the validator. In at least one embodiment, the validation confirmation number will continue to be displayed on the computer screen to the validator until the validator provides another electronic parking validation. Also, in one or more embodiments, the system will include with the validation of time an additional predetermined amount of time to allow the patron to return to their vehicle and exit the parking facility.

In one or more embodiments, if there is a disruption in service, such as a loss in internet connectivity or power, that causes the disclosed system not to be able to provide electronic parking validations, the system will display a disruption in service message to the validator on the computer screen. In at least one embodiment, the disruption in service message will include a description of the cause of the disruption in service, such as internet connectivity or power loss. In addition, in some embodiments, if the disruption in service is caused by a disconnect in internet service, the disclosed system will attempt to reconnect with the internet. In one or more embodiments, the system will attempt to reconnect to the internet for a predetermined number of times over a predetermined time period. After that time period has elapsed, the system will no longer automatically attempt to connect to the internet.

At step 160, once the patron is ready to exit the parking facility, the patron inserts their electronically validated parking ticket into an exit machine, which is located near the exit of the parking facility. The exit machine will confirm that the parking ticket is validated and will allow the patron to exit the parking facility. In one or more embodiments, the exit machine will print and/or burn a validation mark onto the validated parking ticket in order to indicate that the particular ticket was indeed validated.

Figure 2:
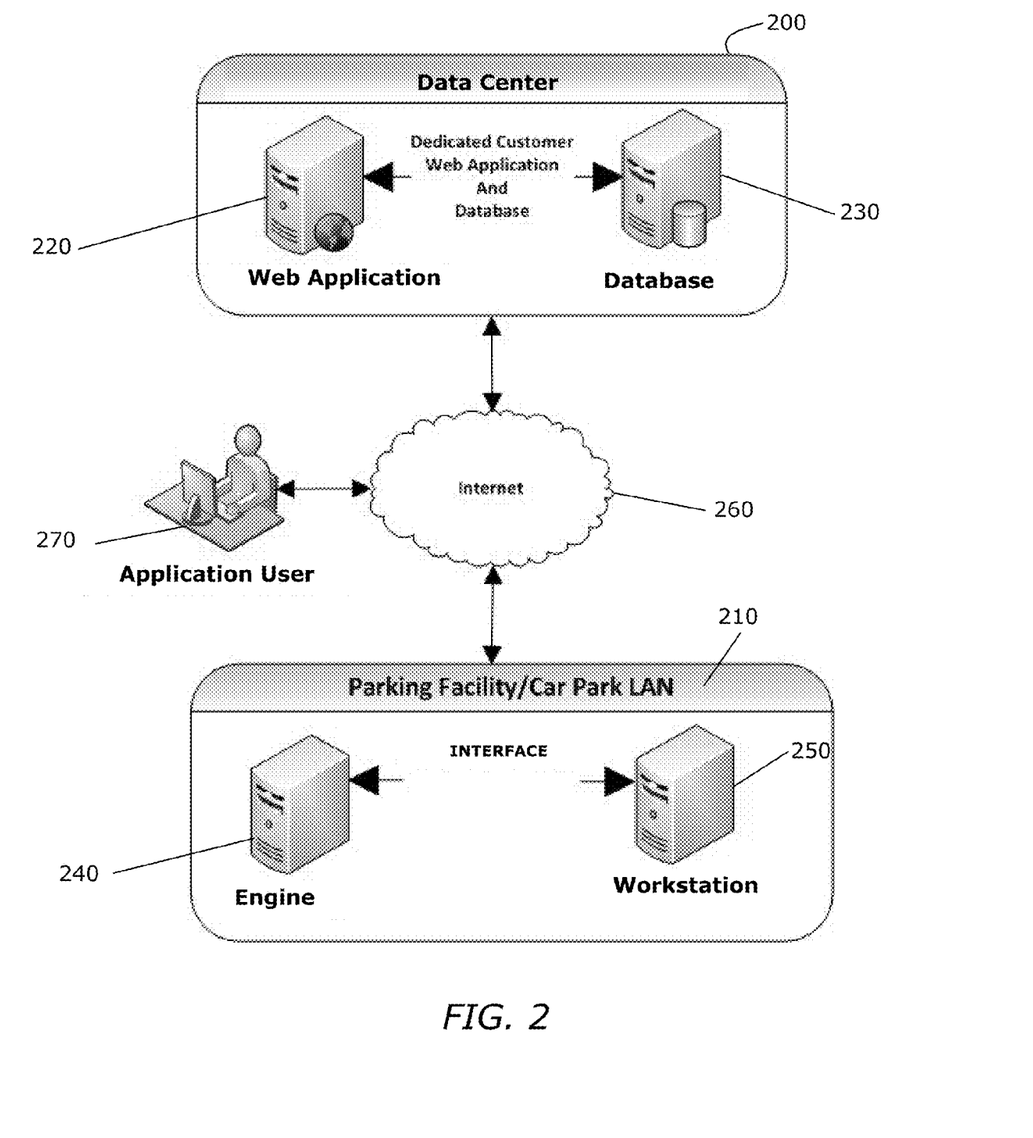
FIG. 2 shows the interconnection of the main components of the disclosed electronic parking validation system and method, in accordance with at least one embodiment of the present disclosure.

FIG. 2 shows the interconnection of the components of the disclosed electronic parking validation system, in accordance with at least one embodiment of the present disclosure. In this figure, the disclosed system is shown to be divided into two main components, which are the data center 200 and the parking facility 210. In one or more embodiments, the data center 200 is at a location remote from the parking facility 210. It should be noted that in some embodiments of the present disclosure, the system can be used to manage multiple parking facilities 210. In addition, in other embodiments, the system is able to validate parking tickets that are dispensed from more than one parking facility 210.

The data center 200 includes a web application 220 and a database 230. For the web application 220, each parking facility is provided with a unique system uniform resource locator (URL). In addition, each parking facility has at least one dedicated system database 230.

The parking facility 210 includes a system engine server 240 and a system workstation 250. The web-based electronic parking validation software used by the disclosed system is installed and configured on the system engine server 240. An application user 270 may access the web-based electronic parking validation system through the internet 260.

The system engine server 240 communicates with the system workstation 250 via an interface. Various types of interfaces can be used by the disclosed system. In addition, the system engine server 250 also communicates with the dedicated hosted web application 220 by sending parking transaction data to the web application 220 and receiving validation commands from the web application 220. The system engine server 240 uses internet 260 connectivity to communicate with the web application 220. The system engine server 240 establishes outgoing TCP connections. It should be noted that existing firewall settings, in some instances, might need to be altered in order to allow the system engine server 140 to establish and maintain a persistent connection with the web application 220.

Figure 3:
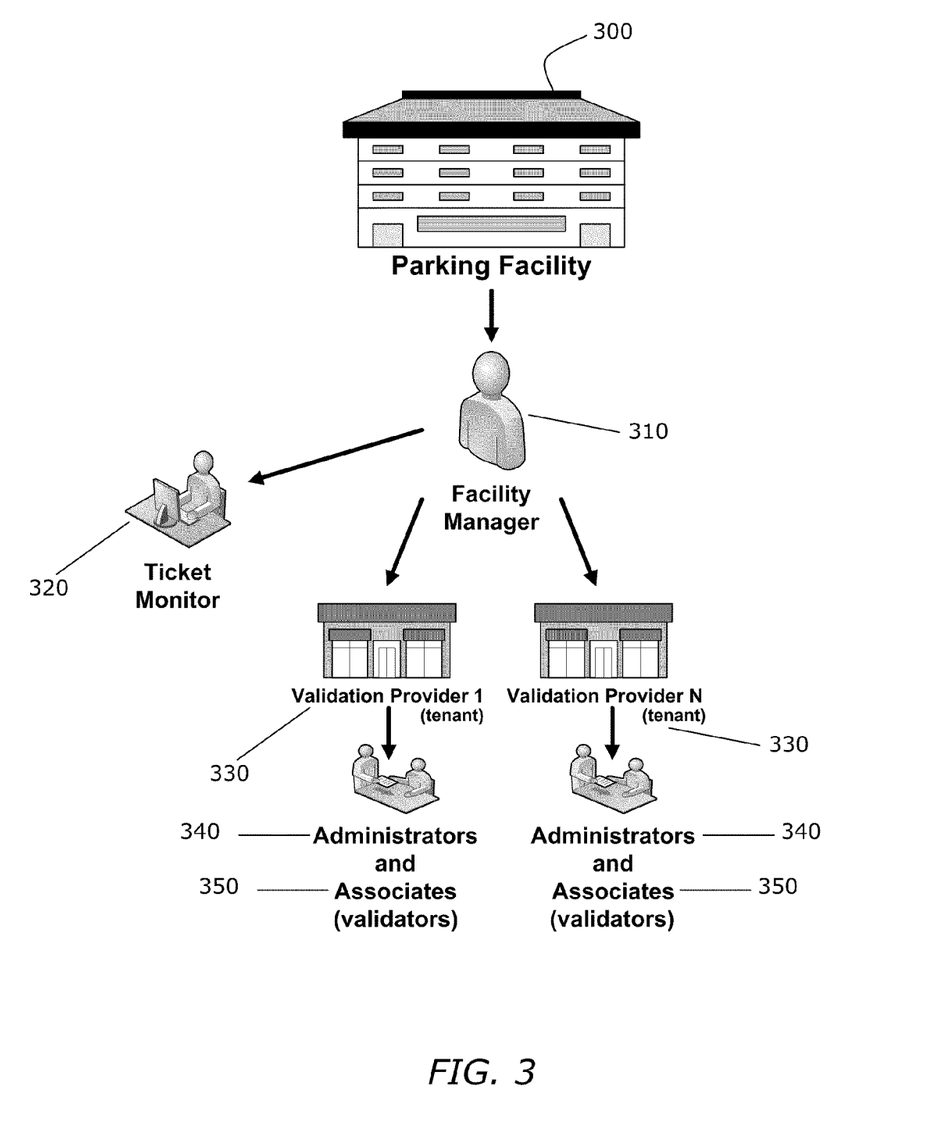
FIG. 3 illustrates the hierarchy of an exemplary parking facility for the disclosed electronic parking validation system and method, in accordance with at least one embodiment of the present disclosure.

FIG. 3 illustrates the facility hierarchy for the disclosed electronic parking validation system, in accordance with at least one embodiment of the present disclosure. In this figure, it can be seen that the parking facility 300 of the disclosed system and method employs multiple levels of users. A parking facility 300 is a physical location where patrons park and receive parking tickets upon entry to the facility 300.

The types of users employed by the system and method include, but are not limited to, a super administrator user (not shown), a facility manager user 310, a ticket monitor user 320, a validation administrator user 340, and a validation associate user 350. The roles and authority of the different types of users vary. As such, each type of user has access to a distinct set of configuration template web pages.

The hierarchy of the relationships of the users and the distinct roles of the different types of users are as follows. The super administrator users create and/or manage the facility manager 310 user accounts. The super administrator user is the only type of user that has a preconfigured account. All of the other types of users of the system must be added to the system by other users of the system.

The disclosed system and method employ exactly one super administrator user. The user in the super administrator role is well versed in the configuration and maintenance of the disclosed web-based electronic parking validation system. The roles and responsibilities of the super administrator users include, but are not limited to, configuring global settings that apply to the system, adding and managing facility information, creating and managing facility manager 310 user accounts, editing personal information, and viewing reports on all system activity.

The facility manager users 310 create and/or manage the validation administrator 340 user accounts as well as the validation provider 330 profiles. In some embodiments, the facility manager user 310 is able to create simultaneously the validation provider 330 profile and a first validation administrator 340 user account for that validation provider 330. In addition, the facility manager users 310 create and/or manage the ticket monitor 320 user accounts. In addition, the validation administrator users 340 are able to configure the disclosed system to display or not to display to a validator patron details entry forms. In at least one embodiment, a patron details entry form contains parking information that is related to a specific validation event for a specific patron.

Also, the disclosed system and method allows for facility manager users 310 to sell electronic validation funds to validation providers 330. The validation providers 330 are able to use these funds to validate their patron's parking tickets by using a standard web browser. A patron is a person who is parking at the parking facility 300 and has been issued a parking ticket.

In addition, the facility manager users 310 are able to configure the disclosed system to provide various types of validations for the parking tickets. Types of validations that may be provided include, but are not limited to, cash based validations, aliases, time based validations, percentage based validations, and/or rate reductions. The alias-type of validations are merely specific validations that are given an alias that the system recognizes. Also, the facility manager users 310 are able to configure the system to establish specific aliases for cash validation amounts. For example, a facility manager user 310 may configure the system to establish a five dollar validation to have the alias of "discount."

Also, the facility manager users 310 are able to configure the disclosed system to allow validation providers 330 to provide validations that are in the form of virtual time denomination tickets. The facility manager users 310 are able to sell virtual validation ticket books to the validation providers 330, where each virtual validation ticket book includes a predetermined number of virtual time denomination tickets. For example, the virtual time denomination tickets each have a predetermined period of time. As such, for example, the one-hour virtual ticket book may include one-hundred (100) one-hour virtual time tickets, the two-hour virtual ticket book may include fifty (50) two-hour virtual time tickets, and the all day virtual ticket book may include ten (10) all day time tickets.

Additionally, the facility manager users 310 are able to configure selectively the validation provider 330 profiles to be charged for over validating or not to be charged for over validating. For example, in the case of the facility manager user 310 configuring the validation provider 330 to be charged for over validating, if a validator that is associated with a validation provider 330 uses a one-hour virtual time ticket to validate a parking ticket of a patron who was only at the parking facility for thirty (30) minutes, the system will charge the validation provider 330 for one-hour of time. In addition, for this case, the disclosed system may be configured to be able to provide to the facility manager users 310 a report for each validation provider 330 that includes the difference between the over validation amount charged to the validation provider 330 and the actual parking fee that was incurred. However, in the alternative case where facility manager user 310 configures the validation provider 330 not to be charged for over validating, the system will only charge the validation provider for thirty (30) minutes of time.

Also, the facility manager users 310 are able to configure the disclosed system to establish parking validation default settings for the validation provider's 330 validators that represent the most common type of parking validation. In one or more embodiments, the validators are able to use the parking validation default settings to provide one-click electronic parking validations to the patrons' parking tickets. For these embodiments, the validator may use an appropriate reader device to scan electronically the unique identifier of the parking ticket in order to provide the one-click electronic parking validation to the parking ticket.

In addition, the facility manager 310 user accounts must be created by the super administrator user. The web-based electronic parking system is able to support multiple parking facilities 300 and multiple facility manager users 310. However, for the disclosed system, one facility manager user 310 is assigned to exactly one parking facility 300. The roles and responsibilities of the facility manager users 310 include, but are not limited to, creating and managing the validation provider 330 profiles, creating and managing the validation administrator 340 user accounts, creating and managing the ticket monitor 320 user accounts, selling validation funds and approving validation fund requests from validation administrator users 340, and generating reports on all of the validation activity within the parking facility 300.

The validation administrator users 340 and the validation associate users 350 are associated with the validation providers 330. In this disclosure, the validation administrator users 340 and the validation associate users 350 are collectively referred to as validators. And, it should be noted that for the present disclosure validation providers are business entities, tenants, and/or departments that are associated with the parking facility 300.

The validation administrator users 340 create and/or manage the validation associate 350 user accounts. The validation administrator 340 user accounts must be created by the facility manager user 310. The web-based electronic parking validation system can support multiple validation administrator users 340 for each validation provider 330. The maximum number of validation administrator users 340 allowed for each validation provider 330 is a configurable option for the facility manager user 310. Each validation administrator user 340 is assigned to exactly one validation provider 330. The disclosed system requires that there be at least one validation administrator user 340 for each validation provider 330. The roles and responsibilities of the validation administrator users 340 include, but are not limited to, creating and managing the validation associate 350 user accounts, issuing validations, approving validation fund requests generated by the validation associate users 350, requesting additional validation funds from the facility manager user 310, and generating reports on validation fund and validation activity.

Also, the disclosed system allows validation administrator users 340 to be able to replenish validation funds for their associated validation provider 330 or pay a portion of a credit balance owed by providing a personal form of payment over the internet, which will deposit funds into a validation provider account. The funds deposited into the validation provider account will be used to provide future electronic parking validations for the parking tickets of the validation provider's 330 patrons. In one or more embodiments, the system allows for a validation provider 330 to have a predetermined line of credit of funds. In at least one embodiment, the facility manager users 310 are able to configure the disclosed system to allow validation providers 330 to be able to prepurchase validation funds. These prepurchased validation funds are deposited into a validation provider account where the validation provider 330 has a predetermined line of validation fund credits.

Additionally, the disclosed system may be configured to send the facility manager user 310 an electronic-mail (email) when the validation administrator user 340 requires and requests additional validation funds. Also, the disclosed system may be configured to send the facility manager user 310 an email replenishment request when the funds in a validation provider account fall below a predetermined threshold limit. In at least one embodiment, when a validation administrator user 340 desires to deposit funds into a validation provider account, a validation administrator user 340 sends a request to replenish funds over the system. In response, the system sends an email to the facility manager user 310 containing a web link that allows the facility manager user 310 to either approve or reject the validation administrator user's 340 request.

The validation associate users 350 do not create or manage other users' accounts. The validation associate 350 user accounts must be created by the validation administrator users 340. The web-based electronic parking validation system can support multiple validation associate users 350 for each validation provider 330. The maximum number of validation associate users 350 allowed for each validation provider 330 is a configurable option for the facility manager user 310. The system does not require that there be at least one validation associate user 350 for each validation provider 330. The roles and responsibilities of the validation associate users 330 include, but are not limited to, issuing validations, requesting additional validation funds from the validation administrator user 340, and generating reports on validation fund and validation activity.

Similar to the validation associate users 350, the ticket monitor users 320 do not create or manage other users' accounts. The ticket monitor 320 user accounts must be created by the facility manager user 310. Ticket monitor users 320 are able to log onto the web-based electronic parking validation system and search for specific parking tickets in order to determine if a parking ticket number is valid and/or if the particular parking ticket has been validated by one or more validation providers 330. The disclosed system can support an unlimited number of users in the ticket monitor user 320 role. The system does not require that there be any ticket monitor 320 user accounts created. The roles and responsibilities of the ticket monitor users 320 include, but are not limited to, searching for the presence of a parking ticket number in the parking facility and determining if the parking ticket has been validated.

In one or more embodiments, a patron may create and/or manage their own personal user account to be used for their own parking validations. In these embodiments, a patron may log onto the disclosed system and set up a personal profile for their own account. The patron will have the ability to provide a personal method of payment to purchase validation funds or provide a credit card, which will be charged on a periodic basis for the cost of the validations issued.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method of providing electronic parking validation, the method comprising:
   providing a parking ticket with a unique identifier to a patron upon arrival to a parking facility, wherein the unique identifier on the parking ticket is associated with parking information stored at a remote location in a web-based electronic parking validation system,
   confirming in real time, with the use of the web-based electronic parking validation system, the parking ticket parking information with electronically stored parking information in said web-based system; and
   providing in real time with the use of the web-based electronic parking validation system, an electronic parking validation for the parking ticket solely based on the information stored in said web-based electronic validation system without use of validation stamps, stickers or follow-up tickets or the like.

2. The method of claim 1, wherein the unique identifier on the parking ticket is a barcode that is associated with said parking information.

3. The method of claim 1, wherein the unique identifier on said parking ticket is stored using an encoding card technology of at least one of the following: magnetic stripe, smart card, and optical card.

4. The method of claim 1, wherein the unique identifier on said parking ticket is a human readable alpha-numeric string that is printed on the parking ticket.

5. The method of claim 1, wherein the unique identifier on said parking ticket is a uniquely identifiable passive radio frequency identifier (RFID) device embedded in the parking ticket.

6. The method of claim 1, wherein the parking ticket includes time and day information relating to the arrival of the patron to the parking facility.

7. The method of claim 1, wherein in order to confirm the parking ticket parking information with the electronically stored parking information and to provide an electronic parking validation for the parking ticket, a validator inputs into the web-based electronic parking validation system the unique identifier that is associated with the parking ticket.

8. The method of claim 7, wherein in order to input the unique identifier into the web-based electronic parking validation system, the validator electronically scans the unique identifier with an electronic barcode scanner.

9. The method of claim 7, wherein in order to input the unique identifier into the web-based electronic parking validation system, the validator manually types into a keyboard an alpha-numeric string coupled to said web-based electronic parking validation system.

10. The method of claim 7, wherein in order to input the unique identifier into the web-based electronic parking validation system, the validator reads the unique identifier with a reading device coupled to said web-based electronic parking validation system for the appropriate encoding card technology.

11. The method of claim 7, wherein in order to input the unique identifier into the web-based electronic parking validation system, the validator reads the unique identifier using a passive RFID reading device coupled to said web-based electronic parking validation system.

12. The method of claim 7, wherein the validator is associated with a validation provider that uses the parking facility for its patrons.

13. The method of claim 12, wherein the validation provider is at least one of the following: a business entity, a tenant, and or a department.

14. The method of claim 13, wherein the validation provider has a predetermined line of credit of funds, and wherein the funds are used to provide the electronic parking validations for the parking tickets of the validation provider's patrons.

15. The method of claim 13, wherein a facility manager user is able to configure the web-based electronic parking validation system to establish parking validation default settings for the validation provider's validators that represent the most common type of parking validation.

16. The method of claim 15, wherein the validators are able to use the parking validation default settings to provide one-click electronic parking validations.

17. The method of claim 16, wherein the validator uses an appropriate reader device to scan electronically the unique identifier of the parking ticket in order to provide the one-click electronic parking validation.

18. The method of claim 7, wherein the validator is a validation administrator user, and wherein the validation administrator user uses the web-based electronic parking validation system to create and manage validation associate user accounts.

19. The method of claim 18, wherein a facility manager user uses the web-based electronic parking validation system to create and manage validation administrator user accounts.

20. The method of claim 19, wherein a facility manager user uses the web-based electronic parking validation system to create and manage validation provider profiles.

21. The method of claim 20, wherein the facility manager user simultaneously creates, in the web-based electronic validation system, the validation provider profile and a first validation administrator user account for that validation provider.

22. The method of claim 20, wherein the facility manager user is able to configure the web-based electronic parking validation system such that the validation provider prepurchases validation funds that are deposited into a validation provider account or the validation provider has a predetermined line of validation fund credits, and wherein the funds are used to provide the electronic parking validations for the parking tickets of the validation provider's patrons.

23. The method of claim 20, wherein the web-based electronic parking validation system is configured to send the facility manager user an electronic-mail (email) replenishment request when funds in a validation provider account fall below a predetermined threshold limit.

24. The method of claim 20, wherein the facility manager user is able to configure the web-based electronic parking validation system to allow the validation providers to provide validations in the form of virtual time denomination tickets.

25. The method of claim 24, wherein the facility manager user sells virtual validation ticket books to the validation providers, wherein each virtual validation ticket book includes a predetermined number of the virtual time denomination tickets.

26. The method of claim 25, wherein the virtual time denomination tickets each have a predetermined denomination of time.

27. The method of claim 20, wherein the facility manager user is able to configure the validation provider to be charged for over validating.

28. The method of claim 27, wherein the web-based electronic parking validation system provides to the facility manager user a report including the difference between the over validation amount and the actual parking fees.

29. The method of claim 20, wherein the facility manager user is able to configure the validation provider not to be charged for over validating.

30. The method of claim 20, wherein the validation administrator user is able to configure the web-based system to display a patron details entry form.

31. The method of claim 19, wherein the web-based electronic parking validation system is configured to send the facility manager user an electronic-mail (email) when the validation administrator user requires and requests additional validation funds.

32. The method of claim 19, wherein when the validation administrator user desires to deposit funds into a validation provider account, the validation administrator user sends a request to replenish funds over the web-based electronic parking validation system, and
wherein, in response, the web-based electronic parking validation system sends an electronic mail (email) to the facility manager user containing a web link that allows the facility manager user to approve or reject the request.

33. The method of claim 19, wherein the facility manager user is able to configure the web-based electronic parking validation system to provide at least one and any combination of the following types of validations: cash, aliases, time, percentage, and rate reduction.

34. The method of claim 19, wherein the facility manager user is able to configure the web-based electronic parking validation system to establish unique aliases for cash validation amounts.

35. The method of claim 18, wherein the validation administrator user is able to replenish validation funds for a validation provider or pay a portion of a credit balance by providing a personal form of payment over an internet which will deposit funds into a validation provider account, and wherein the funds are used to provide electronic parking validations for the parking tickets of the validation provider's patrons.

36. The method of claim 7, wherein the validator is a validation associate user.

37. The method of claim 7, wherein after the parking ticket parking information is confirmed with the electronically stored parking information, an elapsed time from a time of entry of the patron into the parking facility to present is displayed to the validator.

38. The method of claim 7, wherein after an electronic parking validation is provided for the parking ticket, a validation confirmation number is displayed to the validator.

39. The method of claim 38, wherein after a validation confirmation number is displayed to the validator, the validation confirmation number continues to be displayed until the validator provides another electronic parking validation.

40. The method of claim 7, wherein the validator can use a mobile device to provide parking validations to patrons.

41. The method of claim 1, wherein the electronic parking validation includes an additional predetermined amount of time to allow for the patron to return to their vehicle and exit the parking facility.

42. The method of claim 1, wherein the method further comprises displaying a message if there is a disruption in service that causes the web-based electronic parking validation system not to be able to provide electronic parking validations.

43. The method of claim 42, wherein the message includes a description of a cause of the disruption in service.

44. The method of claim 42, wherein if the disruption in service is caused by a disconnect in internet service, the web-based electronic parking validation system will attempt to reconnect to the internet for a predetermined number of times over a predetermined time period.

45. The method of claim 1, wherein the method further comprises transferring pertinent parking information to a database at a location remote from the parking facility.

46. The method of claim 1, wherein the web-based electronic parking validation system can manage multiple parking facilities.

47. The method of claim 1, wherein the web-based electronic parking validation system can validate parking tickets from multiple parking facilities.

48. The method of claim 1, wherein the patron uses the web-based electronic parking validation system to create and manage their own personal user account to be used for their own parking validations.

49. A system for providing electronic parking validations, the system comprising:
- an entry machine, wherein the entry machine provides a parking ticket with a unique identifier to a patron upon arrival to a parking facility, wherein the unique identifier on the parking ticket is associated with parking information stored at a remote location in a web-based electronic parking validation system;
- wherein said web-based electronic parking validation system confirms the parking ticket parking information in real time with electronically stored parking information at said web-based system, and
- wherein the web-based electronic parking validation system provides in real time an electronic parking validation for the parking ticket.

\* \* \* \* \*